United States Patent
Malpani et al.

(10) Patent No.: US 11,711,650 B2
(45) Date of Patent: Jul. 25, 2023

(54) TROUBLESHOOTING OF AUDIO SYSTEM

(71) Applicant: ANI TECHNOLOGIES PRIVATE LIMITED, Bengaluru (IN)

(72) Inventors: Sumit Malpani, Makrana (IN); Prashant Singh Gangwar, Bengaluru (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 83 days.

(21) Appl. No.: 17/370,217

(22) Filed: Jul. 8, 2021

(65) Prior Publication Data

US 2022/0021974 A1 Jan. 20, 2022

(30) Foreign Application Priority Data

Jul. 14, 2020 (IN) .............................. 202041030012

(51) Int. Cl.
*H04R 29/00* (2006.01)
*H04R 3/12* (2006.01)
*G06F 3/16* (2006.01)

(52) U.S. Cl.
CPC ............... *H04R 3/12* (2013.01); *G06F 3/165* (2013.01); *H04R 29/001* (2013.01); *H04R 29/004* (2013.01); *H04R 2499/13* (2013.01)

(58) Field of Classification Search
CPC ................ H04R 29/001; H04R 29/004; H04R 2499/13; H04R 3/12
USPC ............................................... 381/55, 58–59
See application file for complete search history.

(56) References Cited

U.S. PATENT DOCUMENTS

| | | | |
|---|---|---|---|
| 9,380,400 B2 | 5/2016 | Sprogis | |
| 10,679,601 B2* | 6/2020 | Linjama | G10K 11/17853 |
| 10,779,084 B2* | 9/2020 | Arteaga | H04S 7/301 |
| 11,272,301 B2* | 3/2022 | Myers | H04R 3/04 |
| 11,377,041 B2* | 7/2022 | Subat | H04R 1/026 |
| 11,592,328 B2* | 2/2023 | Rengan | H04R 17/00 |
| 2018/0109189 A1 | 4/2018 | Yamkovoy | |

FOREIGN PATENT DOCUMENTS

DE 102012000931 A1 7/2013

\* cited by examiner

*Primary Examiner* — Disler Paul
(74) *Attorney, Agent, or Firm* — Chip Law Group

(57) ABSTRACT

A method, system, and apparatus for troubleshooting one or more multimedia devices of an audio system have been disclosed herein. An audio loopback device transmits a test signal to a first multimedia device. The first multimedia device, after receiving the test signal, generates a response signal. The audio loopback device triggers a priority controller based on an unsuccessful detection of the response signal. The priority controller troubleshoots a communicative coupling by at least changing a mode of operation of at least one of a first multimedia device or a second multimedia device from a first mode of operation to a second mode of operation. The first mode of operation or the second mode of operation may be utilized by the first multimedia device to establish the communicative coupling with the second multimedia device for delivering an audio signal of the second multimedia device on an audio device.

19 Claims, 12 Drawing Sheets

TROUBLESHOOTING OF AUDIO SYSTEM

CROSS-RELATED APPLICATIONS

This application claims priority of Indian Non-Provisional Application No. 202041030012, filed Jul. 14, 2020, the contents of which are incorporated herein by reference.

FIELD

Various embodiments of the disclosure relate generally to troubleshooting. More specifically, various embodiments of the disclosure relate to troubleshooting of an audio system.

BACKGROUND

With the advancement in the user's lifestyle and preferences for various services, service providers have witnessed a breakthrough in quality of services that are provided to users in addition to one or more core services. Examples of the service providers include transport service providers, food service providers, medical service providers, or the like. Nowadays, a service provider not only focuses on providing an optimal service to a user but also takes effort in providing an excellent user experience. In other words, a satisfactory service along with a good user experience may draw more users towards the service provider. Therefore, while providing the core services, the service provider not only aims to make the user satisfied with the core services but also focuses on identifying the user's needs for keeping the user relaxed and positive and accordingly provide the additional services to the user. The service provider may keep the user relaxed by offering a good ambience so that the user may have a good experience while availing the core services.

Generally, the service provider facilitates a good user experience by offering the additional services associated with entertainment (such as music, videos, or the like), in-door sports (such as table tennis, snooker, or similar type activities), or the like. In one example, the service provider provides the abovementioned entertainment services by arranging and installing entertainment devices such as a stereo system, an audio speaker, a video player, and other infrastructure required therefor. However, an unavailability or abrupt interruption of the abovementioned entertainment services may lead to poor user experience and therefore a dissatisfied user. The dissatisfied user may be less likely to visit the service provider again in the future. In an exemplary scenario, a passenger may be listening to radio while commuting in a cab. A sudden interruption in the audio experience coming from the radio may annoy the passenger. Therefore, the passenger may end up with an unpleasant trip with the cab service provider. Further, the passenger may give a low rating to a driver of the cab as well as to the cab service provider. Such low rating may discourage other potential passengers from availing cab services for their rides from the same cab service provider. Thus, it is important to identify such problems in real time and accordingly fix the problems at the earliest so that the passenger can experience a smooth and comfortable ride. Generally, such interruption in the audio may be caused by a poor connection between two or more connected devices (such as the stereo system, the audio speaker, the video player, and the like). Such interruption may also be caused due to an OFF state of at least one of the connected devices, a mute state of at least one of the connected devices, or any other setting, software, or hardware issues associated with at least one of the connected devices. However, there is no existing technique for programmatically diagnosing and resolving such causes without manual efforts. Further, at many instances, diagnosing and resolving such causes may take a lot of time and effort.

In light of the foregoing, there is a need for a technical and reliable solution that takes into consideration the abovementioned problems, challenges, and short-comings and facilitates real time troubleshooting of problems that cause unwanted interruption in audio experience delivered by an audio system.

SUMMARY

Troubleshooting of an audio system is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
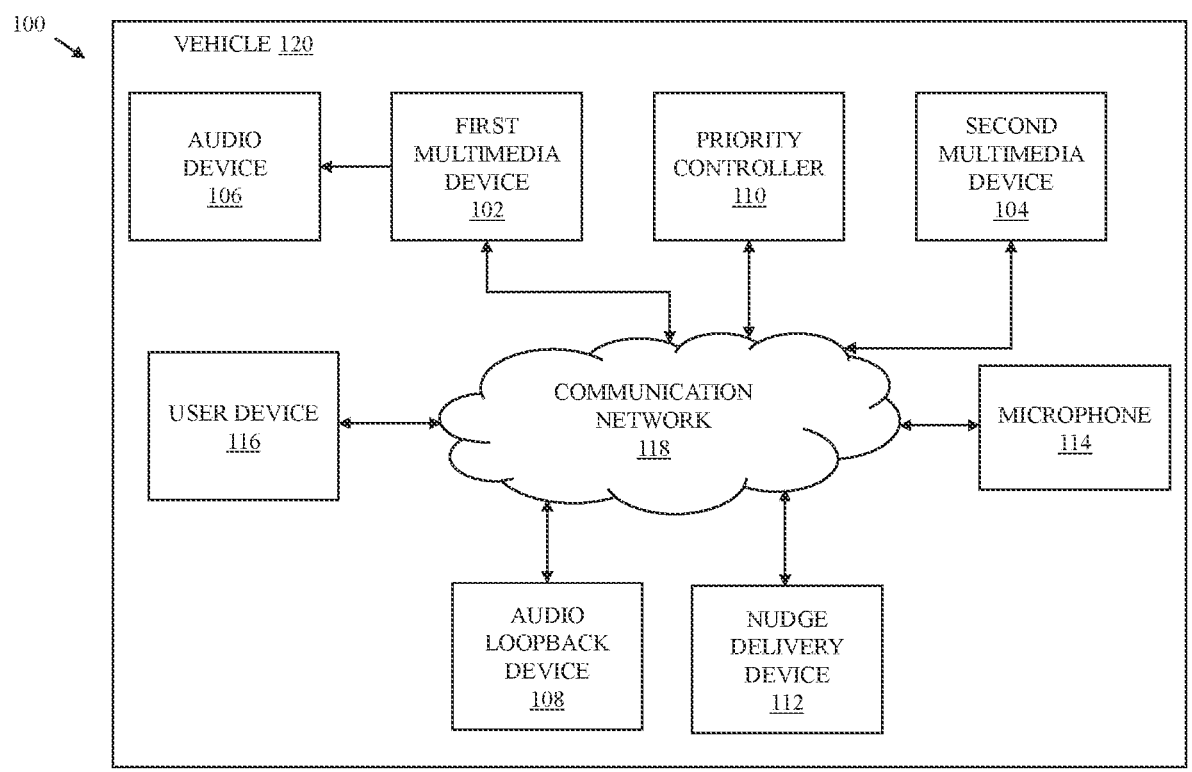
FIG. 1 is a block diagram that illustrates a system environment for troubleshooting an audio system, in accordance with an exemplary embodiment of the disclosure.

Certain embodiments of the disclosure may be found in a disclosed apparatus for troubleshooting an audio system.

Exemplary aspects of the disclosure provide a method and system for troubleshooting the audio system of a vehicle. The audio system of the vehicle may include a plurality of multimedia devices such as a first multimedia device, a second multimedia device, and an audio device. The first multimedia device may be configured to deliver an audio signal of the second multimedia device on the audio device. The method disclosed herein includes one or more operations that are executed by one or more components of the disclosed system to troubleshoot the audio system of the vehicle. The one or more components may include an audio loopback device, a priority controller, and a nudge delivery device. In an exemplary embodiment, the audio loopback device, the priority controller, and the nudge delivery device may be installed in the vehicle. In another exemplary embodiment, the audio loopback device, the priority controller, and the nudge delivery device may be integrated into a standalone apparatus and the apparatus is installed in the vehicle or some other use case environment.

In an embodiment, the audio loopback device may be configured to transmit a test signal to the first multimedia device. In an exemplary embodiment, the test signal may be an ultrasonic signal. The first multimedia device may be configured to receive the test signal from the audio loopback device and generate a response signal based on the test signal. In an exemplary embodiment, the response signal may be one of an ultrasonic signal or an ultrasonic sound. In an embodiment, the audio loopback device may be further configured to determine whether the response signal is detected. The response signal may be detectable based on a microphone associated with at least one of the user device, the first multimedia device, or the second multimedia device. For example, the audio loopback device uses the available microphone to listen to the response signal (such as the ultrasonic signals) played over the vehicle's audio device (such as the vehicle's speaker). Based on an unsuccessful detection of the response signal, the audio loopback device may be further configured to trigger the priority controller to perform troubleshooting of a communicative coupling between the first multimedia device and the second multimedia device of the vehicle.

In an embodiment, the priority controller may be configured to troubleshoot the communicative coupling between the first multimedia device and the second multimedia device by at least changing a mode of operation of at least one of the first multimedia device and the second multimedia device. The mode of operation of the first multimedia device and the second multimedia device refers to a communication mode that is used by the first multimedia device and the second multimedia device to establish the communicative coupling therebetween. For troubleshooting the communicative coupling, the priority controller may be configured to change the mode of operation of at least one of the first multimedia device or the second multimedia device from the first mode of operation to the second mode of operation. In an exemplary embodiment, the first mode of operation may be a wired communication mode. For example, the wired communication between the first multimedia device and the second multimedia device may be established by using an auxiliary (AUX) cable. The wired communication between the first multimedia device and the second multimedia device may be established when both of the first multimedia device and the second multimedia device operate in the first mode of operation. In an exemplary embodiment, the second mode of operation may be a wireless communication mode. For example, the wireless communication between the first multimedia device and the second multimedia device may be established by using the BLUETOOTH™. The wireless communication between the first multimedia device and the second multimedia device may be established when both of the first multimedia device and the second multimedia device operate in the second mode of operation.

Further, in an embodiment, the audio loopback device may be configured to determine whether the response signal is detected. Based on an unsuccessful detection of the response signal even after the change in the mode of operation of at least one of the first multimedia device or the second multimedia device, the audio loopback device may be further configured to trigger the nudge delivery device. In an embodiment, the nudge delivery device may be configured to transmit a nudge notification to the user device. The nudge notification may include a contextual detail associated with the unsuccessful detection of the response signal. In an exemplary embodiment, the contextual detail may include at least one of a cause or reason for the unsuccessful detection or a preferred action for troubleshooting the first multimedia device. The troubleshooting of the first multimedia device may be associated with one of a mute state of the first multimedia device or an operational state of the first multimedia device.

Thus, various methods, systems, and apparatuses of the disclosure provide troubleshooting of an audio system in real time for enhancing the user's experience. The disclosure provides an intelligent feedback loop system for deterministic delivery of infotainment experience on the vehicle's speakers via any commercial head unit. Further, the disclosed methods, systems, and apparatuses facilitate measurement of true in-vehicle infotainment experience delivery through the vehicle's speakers. Further, the disclosed methods, systems, and apparatuses facilitate troubleshooting and contextual help for a driver of the vehicle to fix issues in experience delivery during an ongoing ride.

FIG. 1 is a block diagram that illustrates a system environment 100 for troubleshooting an audio system, in accordance with an exemplary embodiment of the disclosure. The system environment 100 includes a first multimedia device 102, a second multimedia device 104, an audio device 106, an audio loopback device 108, a priority controller 110, a nudge delivery device 112, a microphone 114, and a user device 116.

In an embodiment, the first multimedia device 102, the second multimedia device 104, the audio device 106, the audio loopback device 108, the priority controller 110, the nudge delivery device 112, the microphone 114, and the user device 116 may be communicatively coupled to each other via a communication network 118. In an exemplary embodiment, the first multimedia device 102 may be communicatively coupled to the audio device 106 via the communication network 118. The first multimedia device 102 may be further communicatively coupled to the second multimedia device 104 and the audio loopback device 108 via the communication network 118. The audio loopback device 108 may be communicatively coupled to the priority controller 110 and the nudge delivery device 112 via the communication network 118. The priority controller 110 may be further communicatively coupled to the first multimedia device 102 and the second multimedia device 104 via the communication network 118. Further, the nudge delivery device 112 may be communicatively coupled to the user device 116 via the communication network 118.

In an embodiment, one or more of the first multimedia device 102, the second multimedia device 104, the audio device 106, the audio loopback device 108, the priority controller 110, the nudge delivery device 112, the microphone 114, and the user device 116 may be installed or placed in a vehicle 120. In some other embodiments, one or more of the first multimedia device 102, the second multimedia device 104, the audio device 106, the audio loopback device 108, the priority controller 110, the nudge delivery device 112, the microphone 114, and the user device 116 may be installed or placed in an entertainment room or building or at a public event such as a music concert or a gaming arena. A plurality of these components may be used in conjunction with each other for facilitating the troubleshooting of the audio system associated with the vehicle 120, the entertainment room or building, the music concert, the gaming arena, or the like.

The audio system refers to a system including one or more electronic devices that are configured to generate and output an audio signal of a multimedia file. The audio system may include at least the first multimedia device 102, the second multimedia device 104, and the audio device 106. The audio system may be installed or placed in the vehicle 120 for delivering an audio output (for example, an audio signal) of a multimedia file that is being played on the second multimedia device 104. The audio signal may be delivered via the audio device 106 (such as a speaker) of the vehicle 120. The audio device 106 is communicatively coupled to the first multimedia device 102.

The first multimedia device 102 may include suitable logic, circuitry, interfaces, and/or code, executable by the circuitry, that may be configured to perform one or more operations. For example, the first multimedia device 102 may be configured to deliver the audio signal of the multimedia file (that is being played on the second multimedia device 104) on the audio device 106 of the vehicle 120. The first multimedia device 102 refers to an electronic device that may be installed or placed in front of a driver seat of the vehicle 120. The first multimedia device 102 provides a console (namely, a user interface) for a driver of the vehicle 120 to perform on-duty activities seamlessly. The first multimedia device 102 may be referred to as a driver experience console (DXC) device that is used to perform various operations to configure and control functioning and setting of the audio system of the vehicle 120. Examples of the first multimedia device 102 may include, but are not limited to, a personal computer, a laptop, a smartphone, a tablet, or any other communication device.

In an embodiment, the first multimedia device 102 may be communicatively coupled to the second multimedia device 104 and the audio device 106 for delivering the audio signal of the second multimedia device 104 on the audio device 106. In other words, the audio experience of the second multimedia device 104 is delivered on the audio device 106 based a signal communicated via the first multimedia device 102. The first multimedia device 102 may receive the signal, for delivering the audio signal on the audio device 106, from the second multimedia device 104. Subsequently, the first multimedia device 102 transmits the signal to the audio device 106. Generally, the first multimedia device 102 may be configured to store multimedia files or retrieve the multimedia files from a remote server (not shown) in an online manner. Each multimedia file may have an audio component (i.e., an audio signal), a video component (i.e., a video signal), or a combination of both audio and video components. When the first multimedia device 102 receives a request to play a particular multimedia file from the second multimedia device 104, the first multimedia device 102 retrieves and provides the video component of the requested multimedia file to the second multimedia device 104. Further, when the video component of the requested multimedia file is played on the second multimedia device 104, the first multimedia device 102 may deliver the audio component of the requested multimedia file to the audio device 106 for delivering the audio output of the requested multimedia file.

The second multimedia device 104 may include suitable logic, circuitry, interfaces, and/or code, executable by the circuitry, that may be configured to perform one or more operations. For example, the second multimedia device 104 may be configured to deliver the video component of the requested multimedia file. The second multimedia device 104 refers to an electronic device that may be installed or placed in front of a rear seat of the vehicle 120. The second multimedia device 104 provides an infotainment console (namely, a user interface) to a passenger of the vehicle 120 to perform multimedia related activities seamlessly. The second multimedia device 104 may be referred to as a customer experience console (CXC) device that is used by the passenger to perform the one or more operations related to selection of offline or online multimedia files, playing of a selected multimedia file, or the like. Further, the second multimedia device 104 may be utilized by the passenger of the vehicle 120 to control other operations (such as pause, volume up, volume down, or the like). The second multimedia device 104 may be configured to generate and transmit the signal, for delivering the audio output on the audio device 106, to the first multimedia device 102. Examples of the second multimedia device 104 may include, but are not limited to, a personal computer, a laptop, a smartphone, a tablet, or any other communication device.

In an embodiment, the first multimedia device 102 and the second multimedia device 104 may be communicatively coupled to each other via a first mode of operation or a second mode of operation. The first multimedia device 102 and the second multimedia device 104 both are required to operate in either the first mode of operation or the second mode of operation for establishing the communicative coupling therebetween.

In an embodiment, the first mode of operation is a wired communication mode. The wired communication mode may be established by using an auxiliary (AUX) cable. The auxiliary cable serves as a communication channel between the first multimedia device 102 and the second multimedia device 104. The AUX cable is coupled or connected to both of the first multimedia device 102 and the second multimedia device 104 in order to establish the communicative coupling between the first multimedia device 102 and the second multimedia device 104. In another embodiment, an Ethernet crossover cable is utilized to establish the communicative coupling in the wired communication mode. The Ethernet crossover cable is coupled or connected to both of the first multimedia device 102 and the second multimedia device 104 in order to establish the communicative coupling between the first multimedia device 102 and the second multimedia device 104.

In an embodiment, the second mode of operation is a wireless communication mode. The wireless communication mode may be established by using a wireless personal area network (WPAN) or a wireless local area network (WLAN). Examples of the WPAN may include BLUETOOTH™, Bluetooth Low Energy (BLE), Zigbee, Infrared wireless communication, or the like. Examples of WLAN may include a wireless fidelity (Wi-Fi) network. Both of the first multimedia device 102 and the second multimedia device 104 must be operating in the second mode of operation for establishing the communicative coupling in a wireless manner.

The audio device 106 may include suitable logic, circuitry, interfaces, and/or code, executable by the circuitry, that may be configured to perform one or more operations. For example, the audio device 106 may be configured to output the audio component of the requested multimedia file for delivering the audio component associated with the video component of the requested multimedia file that is being played on the second multimedia device 104. The audio device 106 may be communicatively coupled to at least one of the first multimedia device 102 or the second multimedia device 104 via the communication network 118. The audio device 106 may deliver the audio component based on the signal (generated by the second multimedia device 104) received from the first multimedia device 102. Examples of the audio device 106 may include one or more audio speakers.

The audio loopback device 108 may include suitable logic, circuitry, interfaces, and/or code, executable by the circuitry, that may be configured to perform one or more operations associated with troubleshooting of the audio system. For example, the audio loopback device 108 may be configured to generate a test signal and transmit the test signal to the first multimedia device 102. The audio loopback device 108 may be further configured to determine whether a response signal (generated by the first multimedia device 102 upon receiving the test signal) is detected. A successful detection of the response signal may indicate that the audio signal of the multimedia file (playing on the second multimedia device 104) is being delivered on the audio device 106. However, an unsuccessful detection of the response signal may indicate an interruption in delivery of the audio signal on the audio device 106. Based on an unsuccessful detection of the response signal, the audio loopback device 108 may be further configured to trigger at least one of the priority controller 110 or the nudge delivery device 112.

In an exemplary embodiment, the test signal may be an ultrasonic signal and the response signal may be an ultrasonic signal or an ultrasonic sound. Beneficially, use of the ultrasonic signal or the ultrasonic sound allows for the test signal or the response signal to remain undetected by a listener since the frequencies is higher than the upper audible limit of human hearing. Therefore, the audio signal being delivered on the audio device 106 remains uninterrupted.

In an embodiment, the audio loopback device 108 may be configured to detect the response signal by means of the microphone 114. The microphone 114 may be a standalone device or integrated with at least one of the first multimedia device 102, the second multimedia device 104, or the user device 116. In an exemplary embodiment, the audio loopback device 108 may detect the response signal by continuously listening to the ultrasonic signal that is played by at least one of the first multimedia device 102 or the second multimedia device 104 over the audio device 106 (for example, the vehicle's speakers). The audio loopback device 108 may use the microphone 114 to listen to the ultrasonic signal that is played over the audio device 106 (for example, the vehicle's speakers). Lack of any signals may indicate that the audio signal is not being delivered over the audio device 106 (for example, the vehicle's speakers). In one example, the audio signal may not be delivered over the audio device 106 when the first multimedia device 102 is switched OFF. In another example, the audio signal may not be delivered over the audio device 106 when a communication mode of the first multimedia device 102 is the wired communication mode such as by using an AUX cable but the AUX cable is not plugged into the first multimedia device 102. In another example, the audio signal may not be delivered over the audio device 106 when a volume of the first multimedia device 102 is set to zero or the volume of the first multimedia device 102 is muted.

In an embodiment, the audio loopback device 108 may be further configured to determine a setting, a configuration, a volume level, a state of operation, or a mode of operation of the first multimedia device 102 and the second multimedia device 104. The audio loopback device 108 may also be configured to determine a setting, a configuration, or a volume level of the audio device 106. The audio loopback device 108 may be further configured to communicate a result of the performed detection to the nudge delivery device 112. In an embodiment, the audio loopback device 108 may be configured to continuously transmit the test signal to at least one of the first multimedia device 102 or the second multimedia device 104 and continuously perform a listening operation to detect the response signal. In another embodiment, the audio loopback device 108 may be configured to periodically (for example, after every 5 seconds, 10 seconds, 15, seconds, 30 seconds, 1 minute, 2 minutes, 5 minutes, or the like) transmit the test signal to at least one of the first multimedia device 102 or the second multimedia device 104 and periodically perform a listening operation to detect the response signal.

In an embodiment, the audio loopback device 108 may be automatically triggered to transmit the test signal based on a user input received from at least one of the first multimedia device 102 or the second multimedia device 104. Further, the audio loopback device 108 may remain active in the triggered state during the execution of the multimedia file on the second multimedia device 104. In an embodiment, the audio loopback device 108 may be installed or placed inside the vehicle 120. In some embodiments, the audio loopback device 108 may be enclosed within a body of one of the first multimedia device 102, the second multimedia device 104, or the audio device 106.

The priority controller 110 may include suitable logic, circuitry, interfaces, and/or code, executable by the circuitry, that may be configured to perform one or more operations associated with troubleshooting of the audio system. For example, the priority controller 110 may be configured to troubleshoot the communicative coupling between the first multimedia device 102 and the second multimedia device 104. The communicative coupling may be troubleshooted by at least changing the mode of operation of at least one of the first multimedia device 102 or the second multimedia device 104 from one mode of operation to another mode of operation. In an exemplary embodiment, based on the unsuccessful detection of the response signal by the audio loopback device 108, the audio loopback device 108 may trigger the priority controller 110. The priority controller 110 may be further configured to determine the mode of operation of the first multimedia device 102 and the second multimedia device 104. In one example, the first multimedia device 102 may be operating in the second mode of operation and the second multimedia device 104 may be operating in the first mode of operation. In such a case, the priority controller 110 may change the mode of operation of the second multimedia device 104 to the second mode of operation. The first mode of operation is the wired communication mode (for example, by using the AUX cable or Ethernet cable) and the second mode of operation is the wireless communication mode (for example, by using the BLUETOOTH™, BLE, Zigbee, Wi-Fi, or the like). In another example, the first multimedia device 102 may be operating in the first mode of operation and the second multimedia device 104 may be operating in the second mode of operation. In such a case, the priority controller 110 may change the mode of operation of the first multimedia device 102 to the second mode of operation. In another example, the first multimedia device 102 may be operating in the first mode of operation and the second multimedia device 104 may also be operating in the first mode of operation. In such a case, the priority controller 110 may change the mode of operation of each of the first multimedia device 102 and the second multimedia device 104 to the second mode of operation.

In an embodiment, the priority controller 110 may be further configured to determine a volume level of at least one of the second multimedia device 104 and the audio device 106. Further, the priority controller 110 may be configured to adjust the volume level of at least one of the second multimedia device 104 and the audio device 106. In an example, the volume level of the audio device 106 may be set to zero or the volume of the audio device 106 may be muted. In such a case, the priority controller 110 may adjust the volume level of the audio device 106 to a non-zero value or may unmute the audio device 106 for troubleshooting the audio system. In an embodiment, the priority controller 110 may be further configured to personalize the audio system by modifying the settings of at least one of the first multimedia device 102, the second multimedia device 104, or the audio device 106. In one example, the audio device 106 of the vehicle 120 may have a minimum volume level "0" and a maximum volume level "10". The driver of the vehicle 120, while driving, may get disturbed or distracted due to a high volume of the audio device 106. In such a case, the priority controller 110 may personalize the volume level by setting the maximum volume level to "8" instead of "10". In an embodiment, the priority controller 110 may be configured to customize a default mode of operation of at least one of the first multimedia device 102 or the second multimedia device 104. The first multimedia device 102 and the second multimedia device 104 may have a default mode of operation that may by one of the first mode of operation or the second mode of operation. The priority controller 110 may be configured to change the default mode of operation from the first mode of operation to the second mode of operation, or vice versa.

The nudge delivery device 112 may include suitable logic, circuitry, interfaces, and/or code, executable by the circuitry, that may be configured to perform one or more operations associated with troubleshooting of the audio system. For example, the nudge delivery device 112 may be configured to generate and transmit a nudge notification to the user device 116. The nudge delivery device 112 may transmit the nudge notification when triggered by the audio loopback device 108. The audio loopback device 108 may trigger the nudge delivery device 112 based on the unsuccessful detection of the response signal even after the change in the mode of operation of at least one of the first multimedia device 102 or the second multimedia device 104. The nudge notification may be a message or instruction for troubleshooting the audio system. The nudge notification may include a contextual detail associated with the unsuccessful detection of the response signal. The contextual detail may include at least a cause or reason for the unsuccessful detection. For example, the cause or reason for the unsuccessful detection may indicate that the first multimedia device 102 is in switched OFF state, the communication mode of the first multimedia device 102 is the wired communication mode such as by using an AUX cable but the AUX cable is not plugged into the first multimedia device 102, or the volume of the first multimedia device 102 is set to zero or the volume is muted. The contextual detail may further include at least a preferred action for troubleshooting at least one of the first multimedia device 102 or the second multimedia device 104. For example, the preferred action for troubleshooting may indicate to switch ON the first multimedia device 102, increase the volume level of the first multimedia device 102 to a non-zero value or unmute the volume of the first multimedia device 102, or to check the plugging of the AUX cable into at least one of the first multimedia device 102 or the second multimedia device 104. In another example, the preferred action for troubleshooting may indicate to appropriately plug in the AUX cable into the first multimedia device 102 and the second multimedia device 104.

In an exemplary embodiment, the nudge notification may be transmitted when the second multimedia device 104 is operational. Therefore, the nudge notification may include the contextual detail including at least one of the cause or reason for the unsuccessful detection of the response signal or the preferred action for troubleshooting the first multimedia device 102. In another exemplary embodiment, the nudge notification may be transmitted when the second multimedia device 104 is not operational. Therefore, the nudge notification may include the contextual detail including at least one of the cause or reason for the unsuccessful detection of the response signal or the preferred action for troubleshooting at least one of the first multimedia device 102 or the second multimedia device 104.

In an embodiment, the nudge delivery device 112, when triggered, may receive information associated with the mode of operation, the volume level, or the state of operation of at least one of the first multimedia device 102 or the second multimedia device 104 from the audio loopback device 108. Further, the nudge delivery device 112 may receive information associated with the volume level and the operational state of the audio device 106 from the audio loopback device 108. In one example, the received information may indicate that the volume level of at least one of the first multimedia device 102, the second multimedia device 104, or the audio device 106 is set to zero or the volume is muted. In such a case, the nudge delivery device 112 may generate and transmit a nudge notification to the user device 116. The nudge notification may include a contextual detail such as an instruction to increase the volume level or unmute the volume of at least one of the first multimedia device 102, the second multimedia device 104, or the audio device 106.

The microphone 114 may include suitable logic, circuitry, interfaces, and/or code, executable by the circuitry, that may be configured to perform one or more operations associated with signal generation. For example, the microphone 114 may be configured to convert the sound (such as the ultrasonic sound) into an electrical signal (such as the ultrasonic signal), or vice-versa. In an exemplary embodiment, the microphone 114 may be a standalone device or integrated with at least one of the first multimedia device 102, the second multimedia device 104, or the user device 116. Further, the microphone 114 may be utilized by the audio loopback device 108 to listen to the ultrasonic signal or the ultrasonic sound that is played over the audio device 106 (for example, the vehicle's speakers). Examples of the microphone 114 may include, but are not limited to, a dynamic microphone, a condenser microphone, or a contact microphone. In an embodiment, the microphone 114 may be a transducer that needs to be connected to a preamplifier before the signal can be recorded or reproduced.

The user device 116 may include suitable logic, circuitry, interfaces, and/or code, executable by the circuitry, that may be configured to perform one or more operations associated with capturing and outputting sounds or associated signals. In an exemplary embodiment, the user device 116 may be a computing device of the driver or the passenger associated with the vehicle 120. In an embodiment, the user device 116 may be configured to receive one or more nudge notifications from the nudge delivery device 112. Examples of the user device 116 may include, but are not limited to, a personal computer, a laptop, a smartphone, a tablet, or any other device capable of communicating via the communication network 118.

The communication network 118 may include suitable logic, circuitry, interfaces, and/or code, executable by the circuitry, that may be configured to transmit queries, messages, data, and requests between various entities, such as the first multimedia device 102, the second multimedia device 104, the audio device 106, the audio loopback device 108, the priority controller 110, the nudge delivery device 112, the microphone 114, and the user device 116. Examples of the communication network 118 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the system environment 100 may be coupled to the communication network 118 in accordance with various wired and wireless communication protocols, such as Transmission Control Protocol and Internet Protocol (TCP/IP), User Datagram Protocol (UDP), Long Term Evolution (LTE) communication protocols, or any combination thereof. In an exemplary embodiment, the communication network 118 may be a controlled area network (CAN) bus. The CAN bus provides a common communication channel to various devices and components installed in the vehicle 120 for communicating with each other. The CAN bus is a message-based protocol that allows the various devices and components connected therewith to communicate with each other.

The vehicle 120 may correspond to a mode of transport that is deployed by a vehicle transit system, such as a ride-hailing service provider, to provide vehicle services, for example, performing online allocation of one or more vehicles (such as the vehicle 120) to one or more passengers. The vehicle 120 may be associated with a driver who drives the vehicle 120 from one location to another location to provide vehicle or ride services to the one or more passengers based on the allocation. The vehicle 120 may include suitable logic, circuitry, interfaces and/or code, executable by the circuitry, that may be configured to control and perform one or more operations with or without any driving assistance from the driver. In an embodiment, the vehicle 120 may be deployed by the ride-hailing service provider to cater to traveling requirements of the one or more passengers. In another embodiment, the vehicle 120 may be privately owned by a user and may be used for fulfilling self-traveling requirements. Examples of the vehicle 120 may include, but are not limited to, an automobile, a bus, a car, an auto rickshaw, and a bike.

In operation, the system or the various components disclosed herein may be used for troubleshooting the audio system. For example, the system or the various components may troubleshoot the communicative coupling between a plurality of multimedia devices (such as the first multimedia device 102 and the second multimedia device 104) of the audio system based on a determination that the audio signal (i.e., the audio output) is not being delivered through one or more speakers (i.e., the audio device 106). In one exemplary embodiment, the audio loopback device 108 may be configured to generate and transmit the test signal (such as an ultrasonic signal) to the first multimedia device 102. The first multimedia device 102 may be configured to receive the test signal and generate the response signal (such as an ultrasonic signal or an ultrasonic sound). The response signal is further played by the first multimedia device 102 over the audio device 106 (such as the vehicle's speaker). The audio loopback device 108 may be further configured to determine whether the response signal is detected. During this detection process, the audio loopback device 108 may be responsible for continuously listening to the response signal that is being played by the first multimedia device 102 over the audio device 106. The audio loopback device 108 may utilize any of the available microphones (such as the microphone 114 associated with at least one of the first multimedia device 102, the second multimedia device 104, or the user device 116) to listen to the response signal that is being played over the audio device 106. Based on the unsuccessful detection of the response signal by the audio loopback device 108, the audio loopback device 108 may be further configured to trigger the priority controller 110 to perform troubleshooting of the communicative coupling between the first multimedia device 102 and the second multimedia device 104 of the vehicle 120. Based on the triggering of the priority controller 110 by the audio loopback device 108, the priority controller 110 may be configured to troubleshoot the communicative coupling between the first multimedia device 102 and the second multimedia device 104. The communicative coupling may be troubleshooted by at least changing the mode of operation of at least one of the first multimedia device 102 or the second multimedia device 104 from the first mode of operation to the second mode of operation. The first mode of operation is the wired communication mode (such as communication established by using the AUX cable) and the second mode of operation is the wireless communication mode (such as communication established by using the BLUETOOTH™, BLE, Zigbee, Wi-Fi, or the like). The first mode of operation or the second mode of operation may be utilized by the first multimedia device 102 to establish the communicative coupling with the second multimedia device 104 for delivering the audio signal on the audio device 106 of the vehicle 120. Based on the change of the mode of operation of at least one of the first multimedia device 102 or the second multimedia device 104, the audio loopback device 108 may be further configured to determine whether the response signal is detected. Based on the unsuccessful detection of the response signal even after the change in the mode of operation of at least one of the first multimedia device 102 or the second multimedia device 104, the audio loopback device 108 may be further configured to trigger the nudge delivery device 112. The nudge delivery device 112 may be further configured to transmit the nudge notification to the user device 116. The nudge notification may include the contextual detail associated with the unsuccessful detection of the response signal. The contextual detail may include at least one of the cause or reason for the unsuccessful detection or the preferred action for troubleshooting at least one of the first multimedia device 102 or the second multimedia device 104. The driver of the vehicle 120 may perform the designated action based the nudge notification for troubleshooting at least one of the first multimedia device 102 or the second multimedia device 104. For example, the troubleshooting of the first multimedia device 102 may be associated with one of the mute state of the first multimedia device 102 or the operational state of the first multimedia device 102. The mute state may indicate a "0" volume level of the first multimedia device 102. In such a case, the volume level may be increased to a higher volume level (such as "2,", "3,", or the like) either automatically by the nudge delivery device 112 or manually by the driver of the vehicle 120. The operational state may indicate an "OFF" state of the first multimedia device 102. In such a case, the first multimedia device 102 may be turned "ON" either automatically by the nudge delivery device 112 or manually by the driver of the vehicle 120. Similarly, the second multimedia device 104, if required, may be troubleshooted either automatically by the nudge delivery device 112 or manually by the driver of the vehicle 120.

In another exemplary embodiment, the audio loopback device 108 may be configured to generate and transmit the test signal (such as an ultrasonic signal) to second multimedia device 104. The second multimedia device 104 may be configured to receive the test signal and generate the response signal (such as an ultrasonic signal or an ultrasonic sound). The response signal is further played by the second multimedia device 104 over the audio device 106 (such as the vehicle's speaker). The audio loopback device 108 may be further configured to determine whether the response signal is detected. During this detection process, the audio loopback device 108 may be responsible for continuously listening to the response signal that is being played by the second multimedia device 104 over the audio device 106. The audio loopback device 108 may utilize any of the available microphones (such as the microphone 114 associated with at least one of the first multimedia device 102, the second multimedia device 104, or the user device 116) to listen to the response signal that is being played over the audio device 106. Based on the unsuccessful detection of the response signal by the audio loopback device 108, the audio loopback device 108 may be further configured to trigger the priority controller 110 to perform troubleshooting of the communicative coupling between the first multimedia device 102 and the second multimedia device 104 of the vehicle 120. Based on the triggering of the priority controller 110 by the audio loopback device 108, the priority controller 110 may be configured to troubleshoot the communicative coupling between the first multimedia device 102 and the second multimedia device 104. The communicative coupling may be troubleshooted by at least changing the mode of operation of at least one of the first multimedia device 102 or the second multimedia device 104 from the first mode of operation to the second mode of operation. The first mode of operation is the wired communication mode and the second mode of operation is the wireless communication mode. The first mode of operation or the second mode of operation may be utilized by the first multimedia device 102 (or the second multimedia device 104) to establish the communicative coupling with the second multimedia device 104 (or the first multimedia device 102) for delivering the audio signal of the multimedia file (playing on the second multimedia device 104) on the audio device 106 of the vehicle 120. Based on the change of the mode of operation of at least one of the first multimedia device 102 or the second multimedia device 104, the audio loopback device 108 may be further configured to determine whether the response signal is detected. Based on the unsuccessful detection of the response signal even after the change in the mode of operation of at least one of the first multimedia device 102 or the second multimedia device 104, the audio loopback device 108 may be further configured to trigger the nudge delivery device 112. The nudge delivery device 112 may be further configured to transmit the nudge notification to the user device 116. The nudge notification may include the contextual detail associated with the unsuccessful detection of the response signal. The contextual detail may include at least one of the cause or reason for the unsuccessful detection or the preferred action for troubleshooting at least one of the first multimedia device 102 or the second multimedia device 104. The driver of the vehicle 120 may perform the designated action based the nudge notification for troubleshooting at least one of the first multimedia device 102 or the second multimedia device 104. For example, the troubleshooting of the first multimedia device 102 may be associated with one of the mute state of the first multimedia device 102 or the operational state of the first multimedia device 102. The mute state may indicate a "0" volume level of the first multimedia device 102. In such a case, the volume level may be increased to a higher volume level (such as "2,", "3,", or the like) either automatically by the nudge delivery device 112 or manually by the driver of the vehicle 120. The operational state may indicate an "OFF" state of the first multimedia device 102. In such a case, the first multimedia device 102 may be turned "ON" either automatically by the nudge delivery device 112 or manually by the driver of the vehicle 120. Similarly, the second multimedia device 104, if required, may be troubleshooted either automatically by the nudge delivery device 112 or manually by the driver of the vehicle 120.

Figure 2:
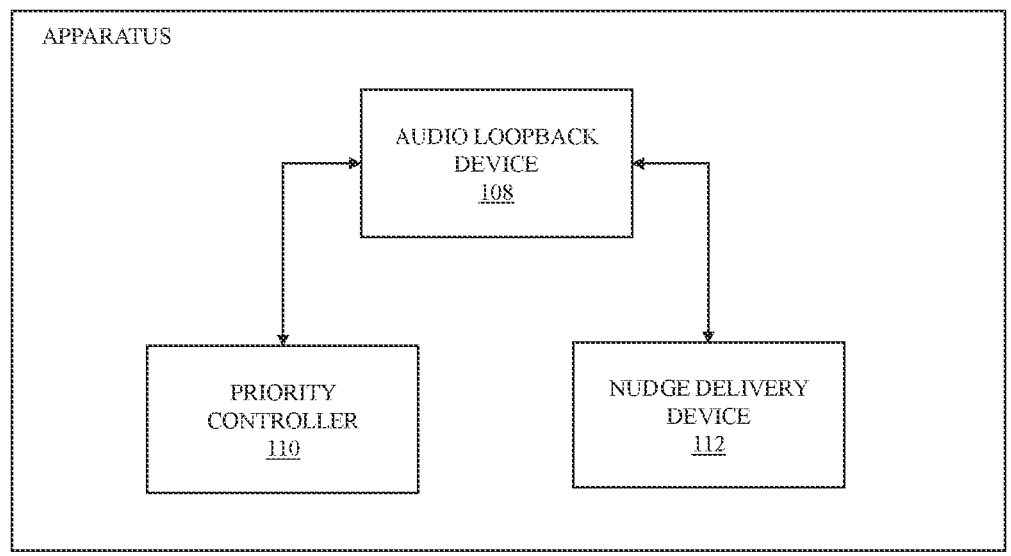
FIG. 2 is a block diagram that illustrates an apparatus for troubleshooting an audio system, in accordance with an exemplary embodiment of the disclosure.

FIG. 2 is a block diagram that illustrates an apparatus 200 for troubleshooting the audio system, in accordance with an exemplary embodiment of the disclosure. The apparatus 200 may include circuitry such as the audio loopback device 108, the priority controller 110, and the nudge delivery device 112. The audio loopback device 108 may be communicatively coupled to the priority controller 110 and the nudge delivery device 112 over a communication bus (not shown). The apparatus 200 may be communicatively coupled to a multimedia device (such as the first multimedia device 102, the second multimedia device 104, a stereo system, or the like) that is configured to play a multimedia file. The apparatus 200 may be configured to perform troubleshooting of the audio system for resolving the interruption in delivery of the audio signal on the audio device 106. In an embodiment, the apparatus 200 may be a standalone device that includes the audio loopback device 108, the priority controller 110, and the nudge delivery device 112. Further, the apparatus 200 may installed or placed in the vehicle 120 or some other use case environment such as a music concert, a sports arena, a restaurant, a smart home, or the like. Functionalities and operations of the various components (such as the audio loopback device 108, the priority controller 110, and the nudge delivery device 112) of the apparatus 200 may be similar to the functionalities and operations of these components as described above in conjunction with FIG. 1.

Figure 3A:
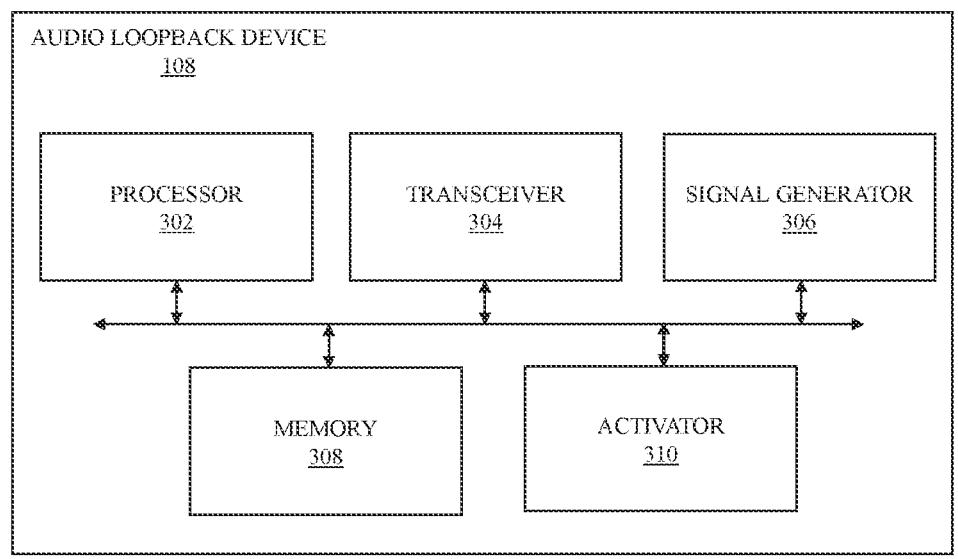
FIG. 3A is a block diagram that illustrates an audio loopback device of the system environment of FIG. 1 or the apparatus of FIG. 2, in accordance with an exemplary embodiment of the disclosure.

FIG. 3A is a block diagram 300A that illustrates the audio loopback device 108, in accordance with an exemplary embodiment of the disclosure. The audio loopback device 108 includes circuitry such as a processor 302, a transceiver 304, a signal generator 306, a memory 308, and an activator 310.

The processor 302 may include suitable logic, circuitry, interfaces, and/or code, executable by the circuitry, that may be configured to perform one or more operations associated with troubleshooting of the audio system. Examples of the processor 302 may include, but are not limited to, an application-specific integrated circuit (ASIC) processor, a reduced instruction set computing (RISC) processor, a complex instruction set computing (CISC) processor, and a field-programmable gate array (FPGA). It will be apparent to a person of ordinary skill in the art that the processor 302 may be compatible with multiple operating systems. In some embodiments, the processor 302 may be configured to operate as a master processing unit, and each of the transceiver 304, the signal generator 306, the memory 308, and the activator 310 may be configured to operate as a slave processing unit. In such a scenario, the processor 302 may be configured to generate and communicate one or more instructions or control commands to the transceiver 304, the signal generator 306, the memory 308, and the activator 310 to perform their corresponding operations either independently or in conjunction with each other.

In an exemplary embodiment, the processor 302 may be configured to transmit the test signal to at least one of the first multimedia device 102 or the second multimedia device 104. The processor 302 may be further configured to determine whether the response signal is detected or not. The processor 302 may process the response signal, if detected, to determine a source of the detected response signal. If the source of the detected response signal indicates at least one of the first multimedia device 102, the second multimedia device 104, or the audio device 106, then the detection may be considered as successful or else the detection may be considered as unsuccessful.

The transceiver 304 may include suitable logic, circuitry, interfaces, and/or code, executable by the circuitry, that may be configured to transmit (or receive) data to (or from) various servers or devices, such as the first multimedia device 102, the second multimedia device 104, or the audio device 106 via the communication network 118. For example, the transceiver 304 may be configured to transmit the test signal to at least one of the first multimedia device 102 or the second multimedia device 104. Examples of the transceiver 304 may include, but are not limited to, an antenna, a radio frequency transceiver, a wireless transceiver, and a Bluetooth transceiver. The transceiver 304 may be configured to communicate with the first multimedia device 102, the second multimedia device 104, or the audio device 106 using various wired and wireless communication protocols, such as TCP/IP, UDP, LTE communication protocols, or any combination thereof.

The signal generator 306 may include suitable logic, circuitry, interfaces, and/or code, executable by the circuitry, that may be configured to perform one or more operations associated with signal generation. For example, the signal generator 306 may be configured to generate a continuous or periodic test signal in a digital form or an analog form. The signal generator 306 may generate the test signal such as the ultrasonic signal having a frequency that is higher than the upper audible limit of human hearing. The signal generator 306 may be implemented by one or more processors, such as, but are not limited to, an ASIC processor, a RISC processor, a CISC processor, and an FPGA processor. Further, the signal generator 306 may include a machine-learning model that implements any suitable machine-learning techniques, statistical techniques, or probabilistic techniques for performing the one or more operations. The one or more processors may also correspond to central processing units (CPUs), graphics processing units (GPUs), network processing units (NPUs), digital signal processors (DSPs), or the like.

The memory 308 may include suitable logic, circuitry, interfaces, and/or code, executable by the circuitry, that may be configured to store one or more instructions that are executed by the processor 302, the transceiver 304, the signal generator 306, and the activator 310 to perform their operations. In an exemplary embodiment, the memory 308 may be configured to temporarily store the test signal. The memory 308 may be further configured to temporarily store the response signal. The memory 308 may be further configured to temporarily store a source address of at least one of the first multimedia device 102, the second multimedia device 104, or the audio device 106. The memory 308 may be further configured to temporarily store the information associated with the setting, the mode of operation, the volume level, or the like associated with at least one of the first multimedia device 102 or the second multimedia device 104. The memory 308 may be further configured to temporarily store the information associated with the volume level and the mode of operation of the audio device 106. Examples of the memory 308 may include, but are not limited to, a random-access memory (RAM), a read-only memory (ROM), a programmable ROM (PROM), and an erasable PROM (EPROM).

The activator 310 may include suitable logic, circuitry, interfaces, and/or code, executable by the circuitry, that may be configured to perform one or more operations associated with activation or triggering of at least one of the priority controller 110 or the nudge delivery device 112. For example, based on the unsuccessful detection of the response signal, the activator 310 may be configured to trigger or activate the priority controller 110 to perform troubleshooting of the communicative coupling between the first multimedia device 102 and the second multimedia device 104. Further, based on the unsuccessful detection of the response signal even after the change in the mode of operation of at least one of the first multimedia device 102 or the second multimedia device 104, the activator 310 may be configured to trigger or activate the nudge delivery device 112. The activator 310 may be implemented by one or more processors, such as, but are not limited to, an ASIC processor, a RISC processor, a CISC processor, and an FPGA processor. Further, the activator 310 may include a machine-learning model that implements any suitable machine-learning techniques, statistical techniques, or probabilistic techniques for performing the one or more operations. The one or more processors may also correspond to CPUs, GPUs, NPUs, DSPs, or the like.

Figure 3B:
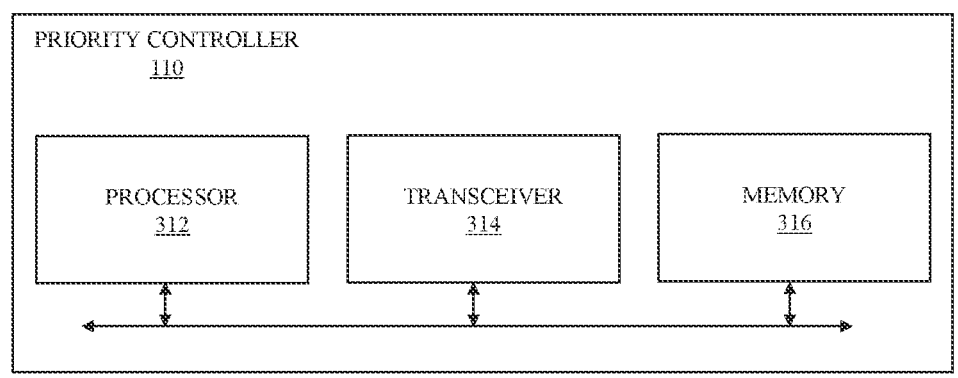
FIG. 3B is a block diagram that illustrates a priority controller of the system environment of FIG. 1 or the apparatus of FIG. 2, in accordance with an exemplary embodiment of the disclosure.

FIG. 3B is a block diagram 300B that illustrates the priority controller 110, in accordance with an exemplary embodiment of the disclosure. The priority controller 110 includes circuitry such as a processor 312, a transceiver 314, and a memory 316.

The processor 312 may include suitable logic, circuitry, interfaces, and/or code, executable by the circuitry, that may be configured to perform one or more operations associated with troubleshooting of the audio system. Examples of the processor 312 may include, but are not limited to, an ASIC processor, a RISC processor, a CISC processor, and an FPGA processor. It will be apparent to a person of ordinary skill in the art that the processor 312 may be compatible with multiple operating systems. In some embodiments, the processor 312 may be configured to operate as a master processing unit, and each of the transceiver 314 and the memory 316 may be configured to operate as a slave processing unit. In such a scenario, the processor 312 may be configured to generate and communicate one or more instructions or control commands to the transceiver 314 and the memory 316 to perform their corresponding operations either independently or in conjunction with each other.

In an exemplary embodiment, the processor 312 may be configured to determine the mode of operation of at least one of the first multimedia device 102 or the second multimedia device 104. The processor 312 may be further configured to troubleshoot the communicative coupling between the first multimedia device 102 and the second multimedia device 104. The processor 312 may perform the troubleshooting by at least changing the mode of operation of at least one of the first multimedia device 102 or the second multimedia device 104 from the first mode of operation to the second mode of operation, or vice-versa. The first mode of operation is the wired communication mode and the second mode of operation is the wireless communication mode. In one example, when the first multimedia device 102 is in the first mode of operation and the second multimedia device 104 is in the second mode of operation, the processor 312 may change the mode of operation of the first multimedia device 102 from the first mode of operation to the second mode of operation. In another example, when the first multimedia device 102 is in the second mode of operation and the second multimedia device 104 is in the first mode of operation, the processor 312 may change the mode of operation of the second multimedia device 104 from the first mode of operation to the second mode of operation. In another example, when the first multimedia device 102 and the second multimedia device 104 are in the first mode of operation, the processor 312 may change the mode of operation of the first multimedia device 102 and the second multimedia device 104 from the first mode of operation to the second mode of operation.

The transceiver 314 may include suitable logic, circuitry, interfaces, and/or code, executable by the circuitry, that may be configured to transmit (or receive) data to (or from) various servers or devices, such as the first multimedia device 102, the second multimedia device 104, the audio device 106, or the audio loopback device 108 via the communication network 118. Examples of the transceiver 314 may include, but are not limited to, an antenna, a radio frequency transceiver, a wireless transceiver, and a Bluetooth transceiver. The transceiver 314 may be configured to communicate with the first multimedia device 102, the second multimedia device 104, the audio device 106, or the audio loopback device 108 using various wired and wireless communication protocols, such as TCP/IP, UDP, LTE communication protocols, or any combination thereof.

The memory 316 may include suitable logic, circuitry, interfaces, and/or code, executable by the circuitry, that may be configured to store one or more instructions that are executed by the processor 312 and the transceiver 314 to perform their operations. In an exemplary embodiment, the memory 316 may be configured to temporarily store the mode of operation of at least one of the first multimedia device 102 or the second multimedia device 104. Examples of the memory 316 may include, but are not limited to, a RAM, a ROM, a PROM, and an EPROM.

Figure 3C:
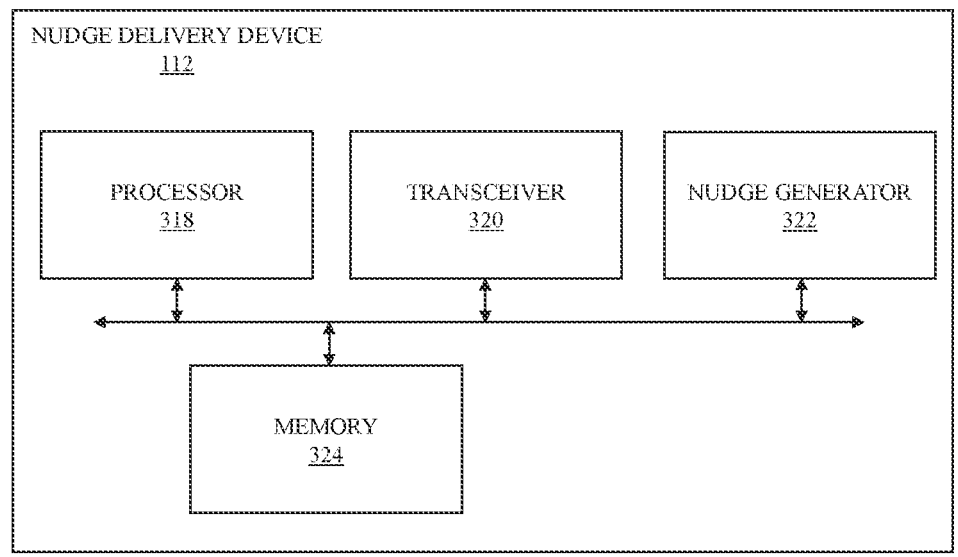
FIG. 3C is a block diagram that illustrates a nudge delivery device of the system environment of FIG. 1 or the apparatus of FIG. 2, in accordance with an exemplary embodiment of the disclosure.

FIG. 3C is a block diagram 300C that illustrates the nudge delivery device 112, in accordance with an exemplary embodiment of the disclosure. The nudge delivery device 112 includes circuitry such as a processor 318, a transceiver 320, a nudge generator 322, and a memory 324.

The processor 318 may include suitable logic, circuitry, interfaces, and/or code, executable by the circuitry, that may be configured to perform one or more operations associated with troubleshooting of the audio system. Examples of the processor 318 may include, but are not limited to, an ASIC processor, a RISC processor, a CISC processor, and an FPGA processor. It will be apparent to a person of ordinary skill in the art that the processor 318 may be compatible with multiple operating systems. In some embodiments, the processor 318 may be configured to operate as a master processing unit, and each of the transceiver 320, the nudge generator 322, and the memory 324 may be configured to operate as a slave processing unit. In such a scenario, the processor 318 may be configured to generate and communicate one or more instructions or control commands to the transceiver 320, the nudge generator 322, and the memory 324 to perform their corresponding operations either independently or in conjunction with each other.

In an exemplary embodiment, the processor 318 may be configured to determine the contextual detail associated with the unsuccessful detection of the response signal by the audio loopback device 108. The processor 318 may be further configured to transmit the nudge notification to the user device 116.

The transceiver 320 may include suitable logic, circuitry, interfaces, and/or code, executable by the circuitry, that may be configured to transmit (or receive) data to (or from) various servers or devices, such as the first multimedia device 102, the second multimedia device 104, the audio device 106, the audio loopback device 108, the priority controller 110, or the user device 116 via the communication network 118. Examples of the transceiver 320 may include, but are not limited to, an antenna, a radio frequency transceiver, a wireless transceiver, and a Bluetooth transceiver. The transceiver 320 may be configured to communicate with the first multimedia device 102, the second multimedia device 104, the audio device 106, the audio loopback device 108, the priority controller 110, or the user device 116 using various wired and wireless communication protocols, such as TCP/IP, UDP, LTE communication protocols, or any combination thereof.

The nudge generator 322 may include suitable logic, circuitry, interfaces, and/or code, executable by the circuitry, that may be configured to perform one or more operations associated with generation of one or more nudge notifications. For example, based on the unsuccessful detection of the response signal even after the change in the mode of operation of at least one of the first multimedia device 102 or the second multimedia device 104, the nudge generator 322 may be configured to generate the nudge notification. The nudge generator 322 may be implemented by one or more processors, such as, but are not limited to, an ASIC processor, a RISC processor, a CISC processor, and an FPGA processor. Further, the nudge generator 322 may include a machine-learning model that implements any suitable machine-learning techniques, statistical techniques, or probabilistic techniques for performing the one or more operations. The one or more processors may also correspond to CPUs, GPUs, NPUs, DSPs, or the like.

The memory 324 may include suitable logic, circuitry, interfaces, and/or code, executable by the circuitry, that may be configured to store one or more instructions that are executed by the processor 318, the transceiver 320, and the nudge generator 322 to perform their operations. In an exemplary embodiment, the memory 324 may be configured to temporarily store the one or more nudge notifications. Examples of the memory 324 may include, but are not limited to, a RAM, a ROM, a PROM, and an EPROM.

Figure 4:
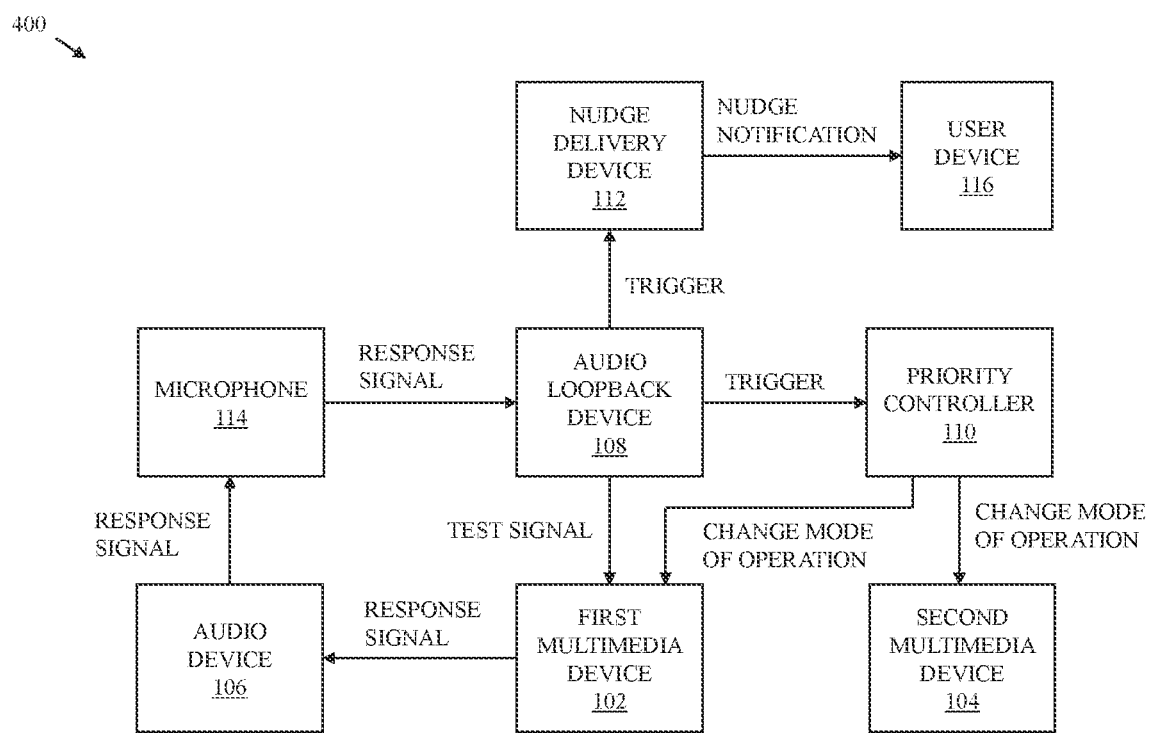
FIG. 4 is a block diagram that illustrates a process flow for troubleshooting the audio system of a vehicle of the system environment of FIG. 1, in accordance with an exemplary embodiment of the disclosure.

FIG. 4 is a block diagram that illustrates a process flow 400 for troubleshooting the audio system of the vehicle 120, in accordance with an exemplary embodiment of the disclosure. In an exemplary embodiment, the audio loopback device 108 may be configured to transmit the test signal to the first multimedia device 102. The first multimedia device 102, upon receiving the test signal from the audio loopback device 108, may be configured to generate the response signal. Further, the first multimedia device 102 may be configured to transmit the response signal to the audio device 106, for example, may play the response signal over the audio device 106 such as the vehicle's speaker. The audio device 106 may communicate the response signal to the microphone 114. The microphone 114 may record the response signal. The audio loopback device 108 may be further operable to detect the response signal from the microphone 114 when the response signal is being played over the audio device 106. The audio loopback device 108 may be further configured to determine whether the response signal is detected. Based on the unsuccessful detection of the response signal, the audio loopback device 108 may be further configured to trigger or activate the priority controller 110. The priority controller 110 may be further configured to troubleshoot the communicative coupling between the first multimedia device 102 and the second multimedia device 104 by at least changing the mode of operation of at least one of the first multimedia device 102 or the second multimedia device 104 from the first mode of operation to the second mode of operation. After changing the mode of operation, the audio loopback device 108 may be further operable to detect the response signal from the microphone 114 when the response signal is being played over the audio device 106. The audio loopback device 108 may be further configured to determine whether the response signal is detected. Upon unsuccessful detection of the response signal even after the change in the mode of operation of at least one of the first multimedia device 102 or the second multimedia device 104, the audio loopback device 108 may be further configured to trigger or activate the nudge delivery device 112. The nudge delivery device 112 may be configured to generate and transmit the nudge notification to the user device 116. The nudge notification may include the contextual detail associated with at least one of the cause or reason for the unsuccessful detection or the preferred action for troubleshooting at least one of the first multimedia device 102 or the second multimedia device 104. In one example, the cause or reason for the unsuccessful detection may indicate that the first multimedia device 102 is in switched OFF state. In another example, the cause or reason for the unsuccessful detection may indicate that the communication mode of the first multimedia device 102 is the wired communication mode such as by using an AUX cable but the AUX cable is not plugged into the first multimedia device 102. In another example, the cause or reason for the unsuccessful detection may indicate that the volume of the first multimedia device 102 is set to zero or the volume is muted. Further, in one example, the preferred action for troubleshooting may indicate to switch ON the first multimedia device 102. In another example, the preferred action for troubleshooting may indicate to increase the volume level of the first multimedia device 102 to a non-zero value or unmute the volume of the first multimedia device 102. In another example, the preferred action for troubleshooting may indicate to check the plugging of the AUX cable into at least one of the first multimedia device 102 or the second multimedia device 104. In another example, the preferred action for troubleshooting may indicate to appropriately plug in the AUX cable into the first multimedia device 102 and the second multimedia device 104.

Figure 5A:
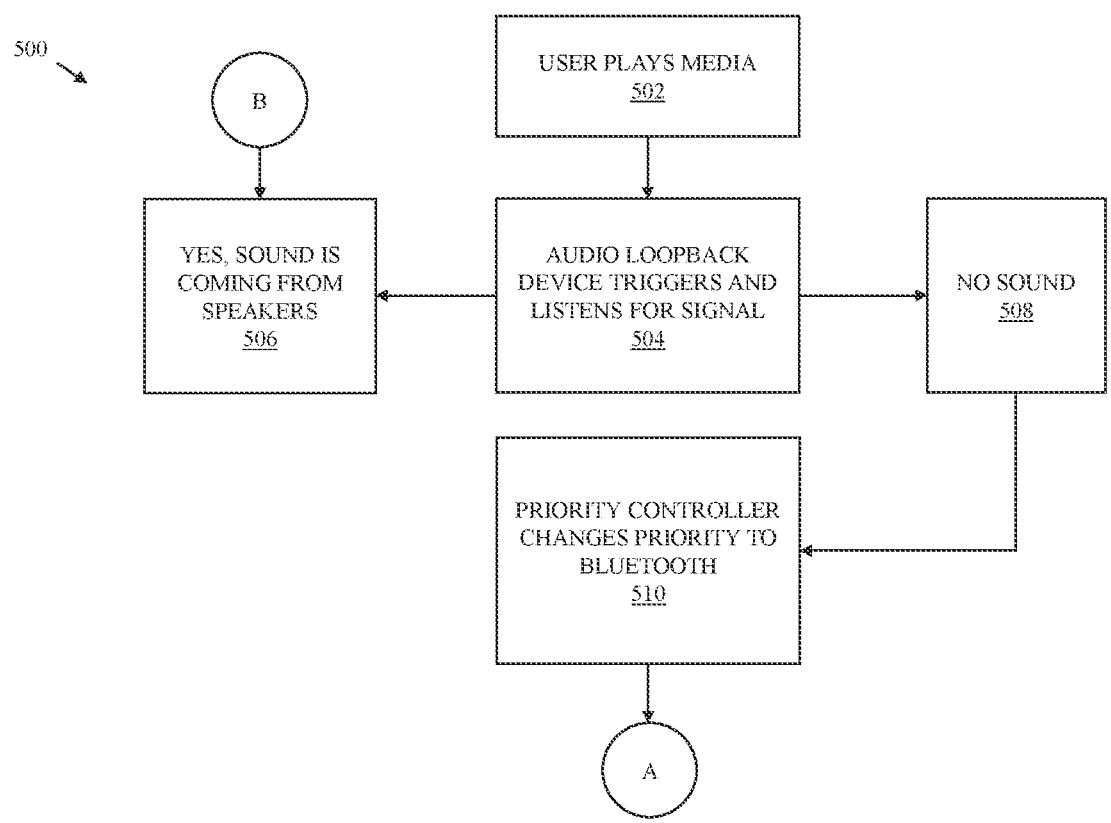
FIGS. 5A and 5B, collectively, is a diagram that illustrates a process flow for troubleshooting the audio system of the vehicle, in accordance with an exemplary embodiment of the disclosure.
Figure 5B:
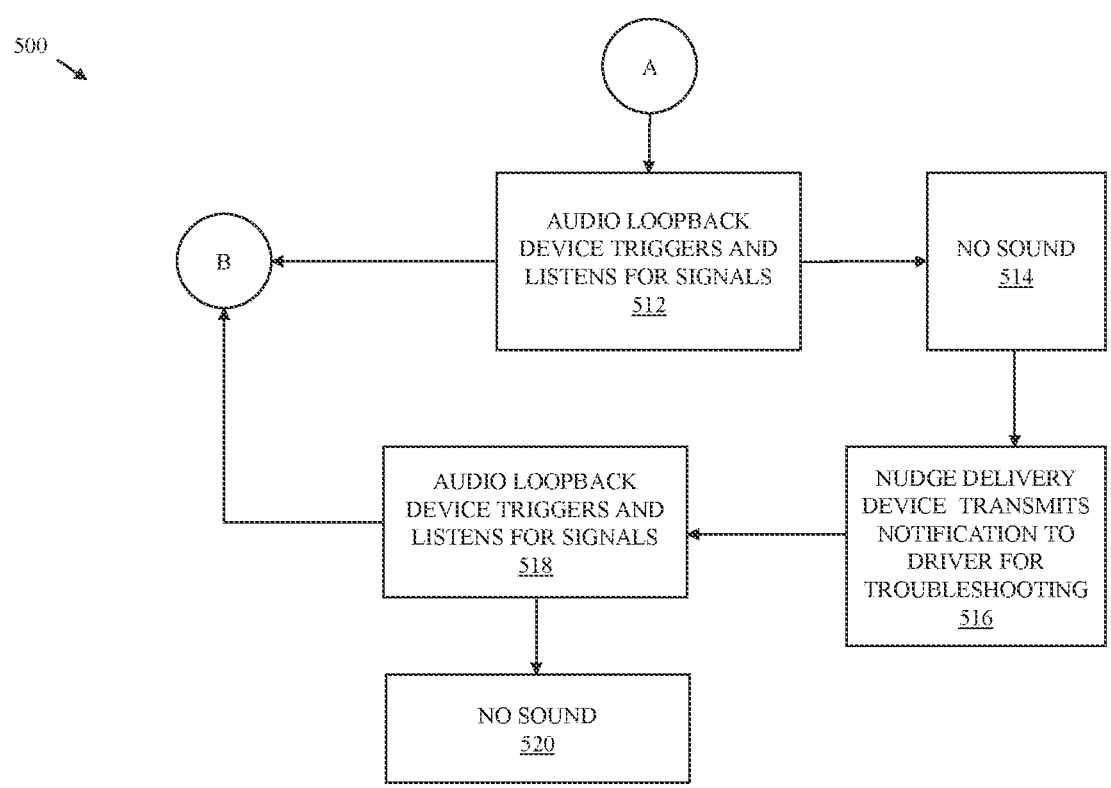

FIGS. 5A and 5B, collectively, is a diagram that illustrates a process flow 500 for troubleshooting the audio system of the vehicle 120, in accordance with an exemplary embodiment of the disclosure. In an exemplary embodiment, a CXC device (such as the second multimedia device 104) may be utilized, by a user sitting on a passenger seat of the vehicle 120, to provide a user input for playing a multimedia content on the CXC device (as shown by 502). Further, the audio loopback device 108, based on the user input, may be automatically triggered, and may start transmitting the test signal to the first multimedia device 102. The first multimedia device 102, based on the test signal, may generate the response signal that is played over the audio device 106 such as the vehicle's speaker. The audio loopback device 108 may start listening or searching for the response signal that is being played over the audio device 106 such as the vehicle's speaker (as shown by 504). Further, the audio loopback device 108 may determine whether the response signal is detected. When the response signal is successfully detected by the audio loopback device 108, it may be determined that the sound (i.e., the audio signal) is coming from the vehicle's speaker (i.e., the audio device 106) and thus the audio system is operating appropriately without any problems such as connection issues (as shown by 506). However, when the response signal is not successfully detected by the audio loopback device 108, it may be determined that the sound (i.e., the audio signal) is not coming from the vehicle's speaker (i.e., the audio device 106) and thus the audio system is not operating properly and may have problems such as connection issues (as shown by 508). Further, the audio loopback device 108 may trigger the priority controller 110. The priority controller 110 may change the priority of the mode of operation of at least one of the first multimedia device 102 or the second multimedia device 104 to the wireless mode such as by using the BLUETOOTH™, BLE, Zigbee, Wi-Fi, or the like (i.e., the second mode of operation) even if the AUX cable is plugged in the second multimedia device 104 (as shown by 510). Further, the audio loopback device 108 may be automatically triggered and may start listening or searching for the response signal that is being played over the audio device 106 such as the vehicle's speaker (as shown by 512). Further, the audio loopback device 108 may determine whether the response signal is detected. When the response signal is successfully detected by the audio loopback device 108, it may be determined that the sound (i.e., the audio signal) is coming from the vehicle's speaker (i.e., the audio device 106) and thus the audio system is now operating appropriately without any problems. However, when the response signal is not successfully detected by the audio loopback device 108, it may be determined that the sound (i.e., the audio signal) is not coming from the vehicle's speaker (i.e., the audio device 106) and thus the audio system may not be operating properly and may have problems such as connection issues (as shown by 514). Further, based on the unsuccessful detection of the response signal even after the change in the mode of operation of at least one of the first multimedia device 102 or the second multimedia device 104, the audio loopback device 108 may trigger or activate the nudge delivery device 112. The nudge delivery device 112 may transmit the nudge notification to the user device 116 (such as a driver device of the driver of the vehicle 120). Based on the nudge notification, one or more designated operations may be performed by the driver for troubleshooting the audio system of the vehicle 120 (as shown by 516). Further, the audio loopback device 108 may be automatically triggered and may again start listening or searching for the response signal that is being played over the audio device 106 such as the vehicle's speaker (as shown by 518). Further, the audio loopback device 108 may determine whether the response signal is detected. When the response signal is successfully detected by the audio loopback device 108, it may be determined that the sound (i.e., the audio signal) is coming from the vehicle's speaker (i.e., the audio device 106) and thus the audio system is now operating appropriately without any problems. However, when the response signal is not successfully detected by the audio loopback device 108, it may be determined that the sound (i.e., the audio signal) is not coming from the vehicle's speaker (i.e., the audio device 106) and thus the audio system may not be operating properly (as shown by 520).

Figure 6:
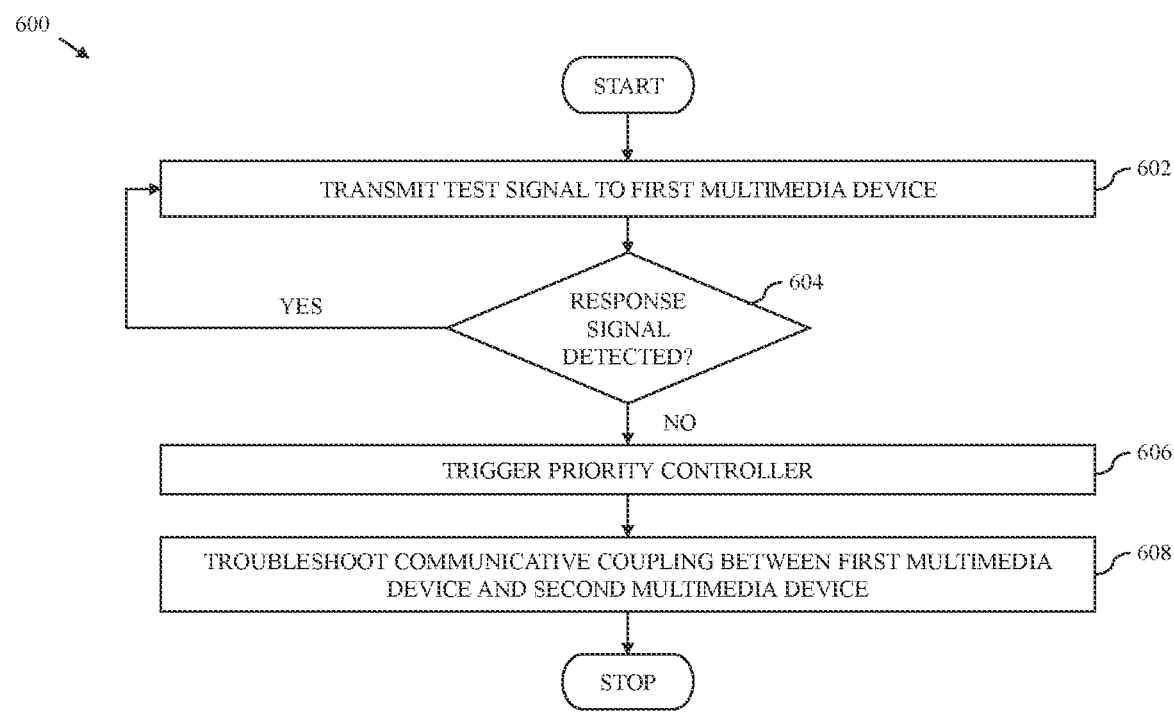
FIG. 6 is a diagram that illustrates a high-level flow chart of a method for troubleshooting a communicative coupling between a first multimedia device and a second multimedia device of the system environment of FIG. 1, in accordance with an exemplary embodiment of the disclosure.

FIG. 6 is a diagram that illustrates a high-level flow chart 600 of a method for troubleshooting the communicative coupling between the first multimedia device 102 and the second multimedia device 104, in accordance with an exemplary embodiment of the disclosure.

At 602, the test signal is transmitted to the first multimedia device 102. In an embodiment, the audio loopback device 108 may be configured to transmit the test signal to the first multimedia device 102. The first multimedia device 102, upon receiving the test signal, may be configured to generate the response signal.

At 604, determine whether the response signal is detected. In an embodiment, the audio loopback device 108 may be further configured to determine whether the response signal is detected based on the playing of the response signal over the audio device 106. If, at 604, it is determined that the response signal is successfully detected by the audio loopback device 108, then the control passes to 602. However, if, at 604, it is determined that the response signal is not detected (i.e., the unsuccessful detection) by the audio loopback device 108, then the control passes to 606.

At 606, the priority controller 110 is triggered. In an embodiment, based on the unsuccessful detection of the response signal, the audio loopback device 108 may be further configured to trigger the priority controller 110 to perform the troubleshooting of the communicative coupling between the first multimedia device 102 and the second multimedia device 104.

At 608, the communicative coupling between the first multimedia device 102 and the second multimedia device 104 is troubleshooted. In an embodiment, the priority controller 110 may be configured to troubleshoot the communicative coupling between the first multimedia device 102 and the second multimedia device 104 by at least changing the mode of operation of at least one of the first multimedia device 102 or the second multimedia device 104 from the first mode of operation to the second mode of operation. The first mode of operation is the wired communication mode and the second mode of operation is the wireless communication mode. Further, the first mode of operation or the second mode of operation may be utilized by the first multimedia device 102 to establish the communicative coupling with the second multimedia device 104 for delivering the audio signal of the second multimedia device 104 on the audio device 106.

Figure 7A:
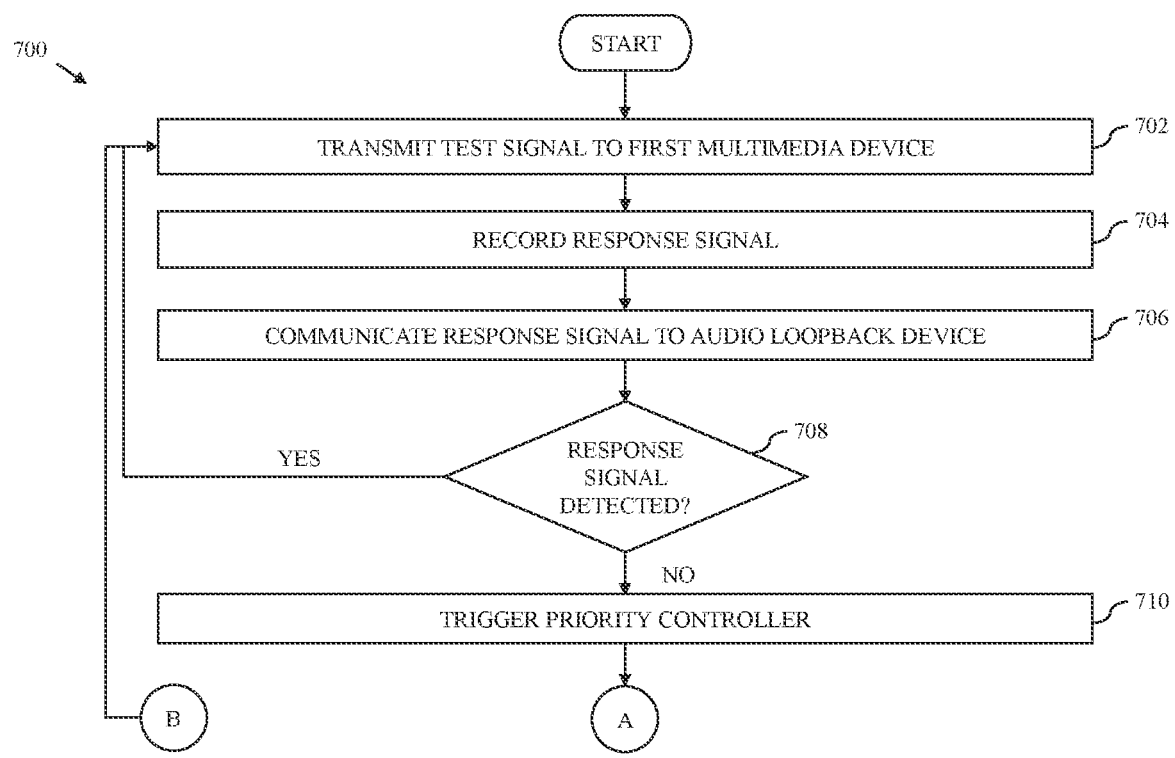
FIGS. 7A and 7B, collectively, is a diagram that illustrates a flow chart of a method for troubleshooting the audio system of the vehicle, in accordance with an exemplary embodiment of the disclosure.
Figure 7B:
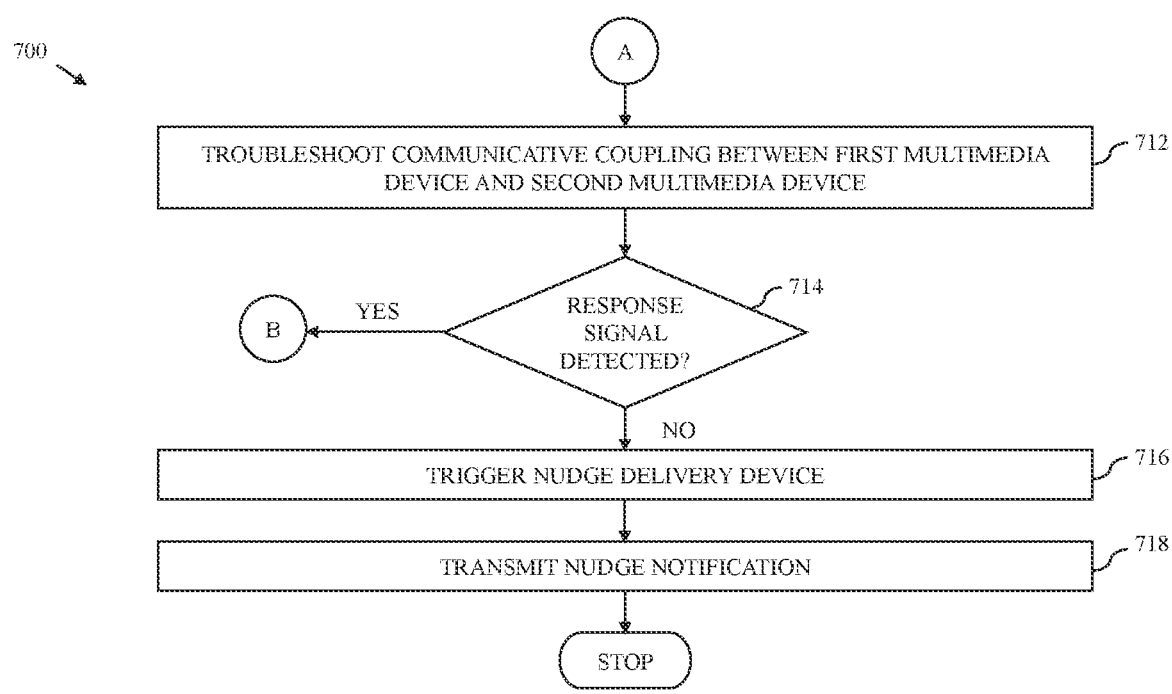

FIGS. 7A and 7B, collectively, is a diagram that illustrates a flow chart 700 of a method for troubleshooting the audio system of the vehicle 120, in accordance with an exemplary embodiment of the disclosure.

At 702, the test signal is transmitted to the first multimedia device 102. In an embodiment, the audio loopback device 108 may be configured to transmit the test signal to the first multimedia device 102. The first multimedia device 102, upon receiving the test signal, may be configured to generate the response signal. The response signal is further played over the audio device 106 such as the vehicle's speaker.

At 704, the response signal is recorded. In an embodiment, the microphone 114 may be configured to record the response signal that is being played over the audio device 106 such as the vehicle's speaker. The microphone 114 may be a standalone device or integrated with at least one of the first multimedia device 102, the second multimedia device 104, or the user device 116.

At 706, the response signal is communicated to the audio loopback device 108. In an embodiment, the microphone 114 may be configured to communicate the response signal to the audio loopback device 108. Alternatively, the audio loopback device 108 may use the microphone 114 to listen or detect the response signal that is being played over the audio device 106 such as the vehicle's speaker.

At 708, determine whether the response signal is detected. In an embodiment, the audio loopback device 108 may be further configured to determine whether the response signal is detected based on the playing of the response signal over the audio device 106. If, at 708, it is determined that the response signal is successfully detected by the audio loopback device 108, then the control passes to 702. However, if, at 708, it is determined that the response signal is not detected (i.e., the unsuccessful detection) by the audio loopback device 108, then the control passes to 710.

At 710, the priority controller 110 is triggered. In an embodiment, based on the unsuccessful detection of the response signal, the audio loopback device 108 may be further configured to trigger the priority controller 110 to perform the troubleshooting of the communicative coupling between the first multimedia device 102 and the second multimedia device 104.

At 712, the communicative coupling between the first multimedia device 102 and the second multimedia device 104 is troubleshooted. In an embodiment, the priority controller 110 may be configured to troubleshoot the communicative coupling between the first multimedia device 102 and the second multimedia device 104 by at least changing the mode of operation of at least one of the first multimedia device 102 or the second multimedia device 104 from the first mode of operation to the second mode of operation. The first mode of operation is the wired communication mode and the second mode of operation is the wireless communication mode. Further, the first mode of operation or the second mode of operation may be utilized by the first multimedia device 102 to establish the communicative coupling with the second multimedia device 104 for delivering the audio signal of the second multimedia device 104 on the audio device 106.

At 714, determine whether the response signal is detected. In an embodiment, the audio loopback device 108 may be further configured to determine whether the response signal is detected based on the playing of the response signal over the audio device 106. If, at 714, it is determined that the response signal is successfully detected by the audio loopback device 108, then the control passes to 702. However, if, at 714, it is determined that the response signal is not detected (i.e., the unsuccessful detection) by the audio loopback device 108 even after the change in the mode of operation of at least one of the first multimedia device 102 or the second multimedia device 104, then the control passes to 716.

At 716, the nudge delivery device 112 is triggered. In an embodiment, based on the unsuccessful detection of the response signal even after the change in the mode of operation of at least one of the first multimedia device 102 or the second multimedia device 104, the audio loopback device 108 may be further configured to trigger the nudge delivery device 112.

At 718, the nudge notification is transmitted. In an embodiment, the nudge delivery device 112 may be configured to transmit the nudge notification to the user device 116. The nudge notification may include the contextual detail associated with the unsuccessful detection of the response signal. For example, the contextual detail may include at least the cause or reason for the unsuccessful detection and the preferred action for troubleshooting at least one of the first multimedia device 102 or the second multimedia device 104. The troubleshooting of the first multimedia device 102 or the second multimedia device 104 may be associated with one of the mute state of the first multimedia device 102 or the second multimedia device 104 or the operational state of the first multimedia device 102 or the second multimedia device 104, respectively.

Figure 8:
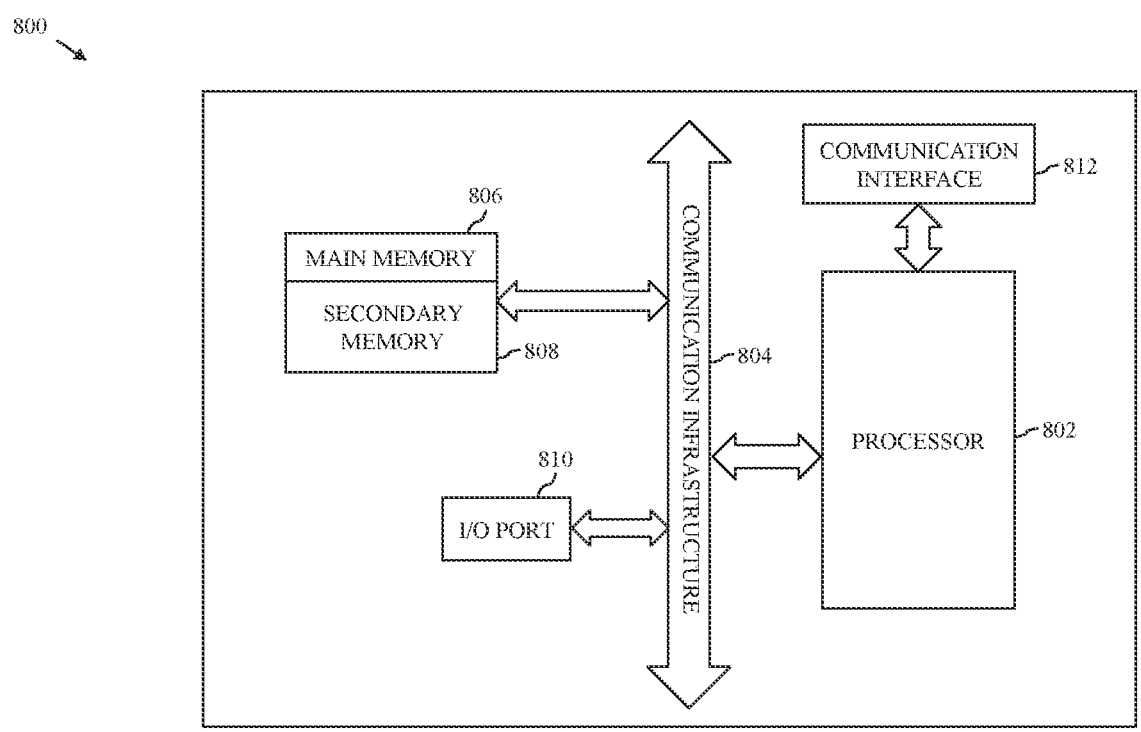
FIG. 8 is a block diagram that illustrates a system architecture of a computer system for troubleshooting the audio system, in accordance with an exemplary embodiment of the disclosure.

FIG. 8 is a block diagram that illustrates a system architecture of a computer system 800 for troubleshooting the audio system, in accordance with an exemplary embodiment of the disclosure. An embodiment of the disclosure, or portions thereof, may be implemented as computer readable code on the computer system 800. In one example, the audio loopback device 108, the priority controller 110, or the nudge delivery device 112 of FIG. 1 or the apparatus 200 of FIG. 2 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6 and 7A-7B.

The computer system 800 may include a processor 802 that may be a special purpose or a general-purpose processing device. The processor 802 may be a single processor, multiple processors, or combinations thereof. The processor 802 may have one or more processor "cores." Further, the processor 802 may be coupled to a communication infrastructure 804, such as a bus, a bridge, a message queue, multi-core message-passing scheme, the communication network 118, or the like. The computer system 800 may further include a main memory 806 and a secondary memory 808. Examples of the main memory 806 may include RAM, ROM, and the like. The secondary memory 808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 800 may further include an input/output (I/O) port 810 and a communication interface 812. The I/O port 810 may include various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communication port, and the like. Data transferred via the communication interface 812 may be signals, such as electronic, electromagnetic, optical, or other signals as will be apparent to a person skilled in the art. The signals may travel via a communications channel, such as the communication network 118, which may be configured to transmit the signals to the various devices that are communicatively coupled to the computer system 800. Examples of the communication channel may include a wired, wireless, and/or optical medium such as cable, fiber optics, a phone line, a cellular phone link, a radio frequency link, and the like. The main memory 806 and the secondary memory 808 may refer to non-transitory computer readable mediums that may provide data that enables the computer system 800 to implement the methods illustrated in FIGS. 6 and 7A-7B.

Various embodiments of the disclosure provide the audio loopback device 108, the priority controller 110, or the nudge delivery device 112, or the apparatus 200 for performing troubleshooting of the audio system. The audio loopback device 108 may be configured to transmit the test signal to the first multimedia device 102. The first multimedia device 102 may further generate the response signal based on the test signal. The audio loopback device 108 may be further configured to determine whether the response signal is detected. Based on the unsuccessful detection of the response signal, the audio loopback device 108 may be further configured to trigger or activate the priority controller 110 to troubleshoot the communicative coupling between the first multimedia device 102 and the second multimedia device 104. The priority controller 110 may be configured to troubleshoot the communicative coupling between the first multimedia device 102 and the second multimedia device 104 based on at least the change in the mode of operation of at least one of the first multimedia device 102 or the second multimedia device 104 from the first mode of operation to the second mode of operation. The first mode of operation or the second mode of operation may be utilized by the first multimedia device 102 to establish the communicative coupling with the second multimedia device 104 to deliver the audio signal of the second multimedia device 104 on the audio device 106.

Various embodiments of the disclosure provide a non-transitory computer readable medium having stored thereon, computer executable instructions, which when executed by a computer, cause the computer to execute operations for performing troubleshooting of the audio system. The operations include transmitting, by the audio loopback device 108 installed in the vehicle 120, the test signal to the first multimedia device 102 of the vehicle 120. The first multimedia device 102 generates the response signal based on the test signal. The operations further include determining, by the audio loopback device 108, whether the response signal is detected. The operations further include triggering, by the audio loopback device 108, based on the unsuccessful detection of the response signal, the priority controller 110 installed in the vehicle 120 to perform troubleshooting of the communicative coupling between the first multimedia device 102 and the second multimedia device 104 of the vehicle 120. The operations further include troubleshooting, by the priority controller 110, the communicative coupling between the first multimedia device 102 and the second multimedia device 104 by at least changing the mode of operation of at least one of the first multimedia device 102 or the second multimedia device 104 from the first mode of operation to the second mode of operation. The first mode of operation or the second mode of operation may be utilized by the first multimedia device 102 to establish the communicative coupling with the second multimedia device 104 for delivering the audio signal of the second multimedia device 104 on the audio device 106 of the vehicle 120.

The disclosed embodiments encompass numerous advantages. Exemplary advantages of the disclosed method, system, and apparatus include, but are not limited to, providing an uninterrupted user experience, real time troubleshooting of an audio system, and significantly minimizing manual efforts in the troubleshooting process of the audio system. In an exemplary embodiment, the disclosed method, system, and apparatus may be used in a vehicle (such as the vehicle 120) for troubleshooting an audio system of the vehicle 120. The audio loopback device 108 continuously transmits the test signal to the first multimedia device 102 or the second multimedia device 104 and performs continuous listening to detect the response signal that is being played by the first multimedia device 102 or the second multimedia device 104 over the audio device 106 such as the vehicle's speaker. Thus, any interruption in the audio experience may be detected as soon as it occurs. Further, the priority controller 110 troubleshoots the communicative coupling between the first multimedia device 102 and the second multimedia device 104 by changing the mode of operation of at least one of the first multimedia device 102 or the second multimedia device 104. The change of mode of operation by the priority controller 110 provides for a swift and unnoticeable troubleshooting of the audio system of the vehicle 120. Further, such troubleshooting by the priority controller 110 significantly minimizes any need for manual efforts in troubleshooting of the audio system. The audio loopback device 108 may again initiate the continuous transmission of the test signal and performs another listening operation to detect the response signal. Such continuous transmission of the test signal and detection of the response signal ensure identification of persistency of the interruption in the audio experience. Further, the audio loopback device 108 triggers the nudge delivery device 112 that transmits the nudge notification to the user device 116. The nudge notification includes the contextual details associated with the cause of the unsuccessful detection and the desirable action for troubleshooting. Therefore, the driver of the vehicle 120 may perform the desirable action and provide real time troubleshooting of the audio system. The contextual details included in the nudge notification may reduce consumption of time for diagnosing the audio system. This may ensure a comfortable and smooth trip to a passenger riding in the vehicle 120. Moreover, the disclosed apparatus 200 may be used with any audio system in any environment such as a restaurant, a smart home, a seminar hall, a movie theatre, a music concert, or the like. The apparatus 200 may troubleshoot the audio system for providing an interrupted audio experience being delivered via the audio system.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems, methods, and apparatuses for troubleshooting one or more audio systems. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method, comprising:
   transmitting, by an audio loopback device installed in a vehicle, a test signal to a first multimedia device of the vehicle, wherein the first multimedia device generates a response signal based on the test signal;
   determining, by the audio loopback device, whether the response signal is detected;
   triggering, by the audio loopback device, based on an unsuccessful detection of the response signal, a priority controller installed in the vehicle to perform troubleshooting of a communicative coupling between the first multimedia device and a second multimedia device of the vehicle, wherein the triggering, by the audio loopback devices further comprises,
      triggering, by the audio loopback device, a nudge delivery device installed in the vehicle, based on an unsuccessful detection of the response signal even after the change in the mode of operation of at least one of the first multimedia device or the second multimedia device; and
      transmitting, by the nudge delivery device, a nudge notification to a user device; and
   troubleshooting, by the priority controller, the communicative coupling between the first multimedia device and the second multimedia device by at least changing a mode of operation of at least one of the first multimedia device or the second multimedia device from a first mode of operation to a second mode of operation,
      wherein the first mode of operation or the second mode of operation is utilized by the first multimedia device to establish the communicative coupling with the second multimedia device for delivering an audio signal of the second multimedia device on an audio device of the vehicle.

2. The method of claim 1, wherein the nudge notification includes a contextual detail associated with the unsuccessful detection of the response signal, and wherein the contextual detail includes at least a cause for the unsuccessful detection and a preferred action for troubleshooting the first multimedia device.

3. The method of claim 1, wherein the troubleshooting of the first multimedia device is associated with one of a mute state of the first multimedia device or an operational state of the first multimedia device.

4. The method of claim 1, wherein the test signal is an ultrasonic signal and the response signal is one of the ultrasonic signal or an ultrasonic sound.

5. The method of claim 1, wherein the response signal is detectable, by the audio loopback device, based on a microphone associated with at least one of a user device, the first multimedia device, or the second multimedia device.

6. The method of claim 1, wherein the first mode of operation is a wired communication mode and the second mode of operation is a wireless communication mode.

7. A system, comprising:
an audio loopback device installed in a vehicle;
a priority controller installed in the vehicle;
an audio device of the vehicle;
a first multimedia device of the vehicle; and
a second multimedia device of the vehicle, wherein
the audio loopback device is configured to:
transmit a test signal to the first multimedia device, wherein the first multimedia device generates a response signal based on the test signal;
determine whether the response signal is detected; and
trigger, based on an unsuccessful detection of the response signal, the priority controller to troubleshoot a communicative coupling between the first multimedia device and the second multimedia device, wherein the trigger further includes, trigger, a nudge delivery device installed in the vehicle, even after the change in the mode of operation of at least one of the first multimedia device or the second multimedia device;
transmit, a nudge notification to a user device; and
the priority controller is configured to troubleshoot the communicative coupling between the first multimedia device and the second multimedia device based on at least a change in a mode of operation of at least one of the first multimedia device or the second multimedia device from a first mode of operation to a second mode of operation,
wherein the first mode of operation or the second mode of operation is utilized by the first multimedia device to establish the communicative coupling with the second multimedia device to deliver an audio signal of the second multimedia device on the audio device.

8. The system of claim 7, further comprising a nudge delivery device installed in the vehicle, wherein
the audio loopback device is further configured to determine whether the response signal is detected,
the audio loopback device is further configured to trigger the nudge delivery device, based on an unsuccessful detection of the response signal even after the change in the mode of operation of at least one of the first multimedia device or the second multimedia device, and
the nudge delivery device is configured to transmit a nudge notification to a user device.

9. The system of claim 8, wherein the nudge notification includes a contextual detail associated with the unsuccessful detection of the response signal, and wherein the contextual detail includes at least one of a cause for the unsuccessful detection or a preferred action to troubleshoot the first multimedia device.

10. The system of claim 9, wherein the troubleshoot of the first multimedia device is associated with one of a mute state of the first multimedia device or an operational state of the first multimedia device.

11. The system of claim 7, wherein the test signal is an ultrasonic signal and the response signal is one of the ultrasonic signal or an ultrasonic sound.

12. The system of claim 7, wherein the audio loopback device is further configured to detect the response signal based on a microphone associated with at least one of a user device, the first multimedia device, or the second multimedia device.

13. The system of claim 7, wherein the first mode of operation is a wired communication mode and the second mode of operation is a wireless communication mode.

14. An apparatus, comprising:
an audio loopback device; and
a priority controller, wherein
the audio loopback device is configured to:
transmit a test signal to a first multimedia device, wherein the first multimedia device generates a response signal based on the test signal; determine whether the response signal is detected; and
trigger, based on an unsuccessful detection of the response signal, the priority controller to perform troubleshoot of a communicative coupling between the first multimedia device and a second multimedia device, and further, trigger, a nudge delivery device installed in the vehicle, even after the change in the mode of operation of at least one of the first multimedia device or the second multimedia device;
transmit, a nudge notification to a user device; and
the priority controller is configured to troubleshoot the communicative coupling between the first multimedia device and the second multimedia device based on at least a change in a mode of operation of at least one of the first multimedia device or the second multimedia device from a first mode of operation to a second mode of operation,
wherein the first mode of operation or the second mode of operation is utilized by the first multimedia device to establish the communicative coupling with the second multimedia device to deliver an audio signal of the second multimedia device on an audio device communicatively coupled with the first multimedia device.

15. The apparatus of claim 14, further comprising a nudge delivery device, wherein the audio loopback device is further configured to determine whether the response signal is detected,
the audio loopback device is further configured to trigger the nudge delivery device, based on an unsuccessful detection of the response signal even after the change in the mode of operation of at least one of the first multimedia device or the second multimedia device, and
the nudge delivery device is configured to transmit a nudge notification to a user device.

16. The apparatus of claim 15, wherein the nudge notification includes a contextual detail associated with the unsuccessful detection of the response signal, and wherein the contextual detail includes at least one of a cause for unsuccessful detection or a preferred action to troubleshoot the first multimedia device.

17. The apparatus of claim 16, wherein the troubleshoot of the first multimedia device is associated with one of a mute state of the first multimedia device or an operational state of the first multimedia device.

18. The apparatus of claim 14, wherein the test signal is an ultrasonic signal and the response signal is one of the ultrasonic signal or an ultrasonic sound.

19. The apparatus of claim 14, wherein the first mode of operation is a wired communication mode and the second mode of operation is a wireless communication mode.

* * * * *